(12) United States Patent
Luber et al.

(10) Patent No.: US 10,771,339 B2
(45) Date of Patent: Sep. 8, 2020

(54) AUTOMATED TOPOLOGY SCAN

(71) Applicant: Endress+Hauser Process Solutions AG, Reinach (CH)

(72) Inventors: Werner Luber, Allschwil (CH); Ingomar Sotriffer, Efringen-Kirchen (DE); Michael Mayer, Oberwil (CH)

(73) Assignee: Endress+Hauser Process Solutions AG, Reinach (CH)

( * ) Notice: Subject to any disclaimer, the term of this patent is extended or adjusted under 35 U.S.C. 154(b) by 55 days.

(21) Appl. No.: 15/574,362

(22) PCT Filed: Apr. 26, 2016

(86) PCT No.: PCT/EP2016/059311
§ 371 (c)(1),
(2) Date: Nov. 15, 2017

(87) PCT Pub. No.: WO2016/184649
PCT Pub. Date: Nov. 24, 2016

(65) Prior Publication Data
US 2018/0139102 A1    May 17, 2018

(30) Foreign Application Priority Data

May 21, 2015  (DE) .......................... 10 2015 108 053

(51) Int. Cl.
*H04L 12/24* (2006.01)
*H04L 12/40* (2006.01)
(Continued)

(52) U.S. Cl.
CPC .............. *H04L 41/12* (2013.01); *H04L 12/40* (2013.01); *H04L 12/4625* (2013.01); *H04L 41/20* (2013.01); *H04L 61/00* (2013.01)

(58) Field of Classification Search
None
See application file for complete search history.

(56) References Cited

U.S. PATENT DOCUMENTS

2007/0058570 A1\* 3/2007 Singh ................. H04L 41/0866
370/254
2009/0049207 A1    2/2009 Reynolds et al.
(Continued)

FOREIGN PATENT DOCUMENTS

CN       101803285 A     8/2010
CN       103221891 A     7/2013
(Continued)

OTHER PUBLICATIONS

Search Report for German Patent Application No. 10 2015 108 053.2, German Patent Office, dated Jan. 29, 2016, 7 pp.
International Search Report for Patent Application No. PCT/EP2016/059311, WIPO, dated Jun. 29, 2016, 11 pp.

*Primary Examiner* — Thomas J Dailey
(74) *Attorney, Agent, or Firm* — Mark A. Logan; Endress+Hauser (USA) Holding Inc.

(57) ABSTRACT

A method for automatically registering a topology of a fieldbus network from a device access software. The device access software is installed in a host, which is in data connection with the fieldbus network, and the fieldbus network includes a plurality of field devices and gateway devices. The method includes scanning an address space of a field access device or a predetermined gateway device of the fieldbus network and determining gateway devices and field devices present in this address space. For each found gateway device, the method includes scanning an additional address space provided by the found gateway device and determining additional gateway devices and field devices present in the additional address space. The method is repeated until all gateway devices present in the fieldbus network in the region below the field access device or the predetermined gateway device are found or until a break condition is fulfilled.

12 Claims, 6 Drawing Sheets

(51) Int. Cl.
*H04L 12/46* (2006.01)
*H04L 29/12* (2006.01)

(56) References Cited

U.S. PATENT DOCUMENTS

| | | | | | |
|---|---|---|---|---|---|
| 2009/0064046 | A1* | 3/2009 | Childers | ............. | H04L 12/2825 |
| | | | | | 715/835 |
| 2009/0319062 | A1* | 12/2009 | Schwalbe | .......... | G05B 19/4185 |
| | | | | | 700/86 |
| 2012/0089239 | A1* | 4/2012 | Sentgeorge | ........ | G05B 19/4185 |
| | | | | | 700/2 |
| 2012/0233370 | A1* | 9/2012 | Kolblin | ................ | G05B 19/042 |
| | | | | | 710/305 |
| 2014/0337429 | A1* | 11/2014 | Asenjo | .................. | H04L 65/403 |
| | | | | | 709/204 |
| 2014/0358251 | A1* | 12/2014 | Smith | ............... | G05B 19/41845 |
| | | | | | 700/17 |
| 2014/0359095 | A1 | 12/2014 | Smith et al. | | |
| 2014/0359455 | A1 | 12/2014 | Smith et al. | | |
| 2014/0359458 | A1* | 12/2014 | Smith | ..................... | H04L 41/22 |
| | | | | | 715/736 |
| 2015/0113423 | A1 | 4/2015 | Giango et al. | | |

FOREIGN PATENT DOCUMENTS

| | | |
|---|---|---|
| DE | 102008027846 A1 | 12/2009 |
| WO | 2013072425 A1 | 5/2013 |
| WO | 2014193644 A1 | 12/2014 |
| WO | 2016119956 A1 | 8/2016 |

\* cited by examiner

AUTOMATED TOPOLOGY SCAN

CROSS-REFERENCE TO RELATED APPLICATIONS

The present application is related to and claims the priority benefit of German Patent Application No. 10 2015 108 053.2, filed on May 21, 2015 and International Patent Application No. PCT/EP2016/059311 filed on Apr. 26, 2016 the entire contents of which are incorporated herein by reference.

TECHNICAL FIELD

The invention relates to a method for automatically registering a topology of a fieldbus network as well as to a control software module for automatically registering a topology of a fieldbus network from a device access software. Furthermore, the invention relates to a device access software, which is designed to access devices of a fieldbus network.

BACKGROUND

In automation technology, field devices are often applied, which serve for registering and/or influencing process variables. Examples of such field devices are fill level measuring devices, mass flow measuring devices, pressure- and temperature measuring devices, etc., which, as sensors, register the corresponding process variables, fill level, flow, pressure, and temperature, respectively.

The parametering, configuration and state monitoring of the field devices of a fieldbus network occurs, as a rule, by means of a device access software installed in a host. In a typical device access software, the hierarchical structure of the fieldbus network is recreated with the assistance of device drivers, e.g. device description files. The arrangement of the device drivers, e.g. the device description files, resembles a mirror image of the structure of the device access software.

It is, consequently, an object of the invention, to provide a method and a control software module, with which the topology of a fieldbus network can be registered.

SUMMARY

This object is achieved by the features set forth in claims 1, 16 and 17.

Advantageous further developments of the invention are set forth in the dependent claims.

The method corresponding to the forms of embodiment of the invention serves for automatically registering a topology of a fieldbus network from a device access software. The device access software is installed in a host, which is in data connection with the fieldbus network, and the fieldbus network includes a plurality of field devices and gateway devices. The method includes scanning an address space of a field access device or a predetermined gateway device of the fieldbus network and determining gateway devices and field devices present in this address space. For each found gateway device, the method includes scanning an additional address space provided by the found gateway device and determining additional gateway devices and field devices present in the additional address space. The preceding step is repeated for each further found gateway device, until all gateway devices present in the fieldbus network in the region below the field access device or the predetermined gateway device are found or until a break condition is fulfilled.

The method begins with scanning the address space of the field access device or a selected gateway device. When within the searched address space a further gateway device is found, automatically a scan is also initiated for the address space of this additional gateway device. As the process continues, in each case, when a further gateway device is found, automatically a scan of the address space of this gateway device is initiated. With the help of these recursive scanning operations, it is possible to scan the fieldbus network completely to its bottom and, in this way, to register the complete topology of the fieldbus network. The method is able, automatically and without other interaction with the user, to scan through a complete fieldbus network and to register its topology. Also, complex, nested fieldbus networks can be scanned faultlessly with the method.

The method can be used e.g. to ascertain a topology of an unknown fieldbus network. Moreover, the method can be used to detect changes in an earlier scanned fieldbus network since the time of the earlier scan. Moreover, the method can be used for establishing suitable drivers in the device access software. For this, each time that a new field device or gateway device is found during the scan of a fieldbus network, a suitable driver for this component is instantiated in the device access software. In this way, right during the scanning procedure, a suitable hierarchical driver structure for the fieldbus network is produced.

The method for automatically registering a topology of a fieldbus network saves much time. In contrast to the past, operating personnel do not need to be continually on-site, when the fieldbus network is scanned. A more comprehensive scan can be performed, especially also over night.

BRIEF DESCRIPTION OF THE DRAWINGS

The invention will now be explained in greater detail based on examples of embodiments illustrated in the drawing, the figures of which show as follows.

DETAILED DESCRIPTION

Figure 1:
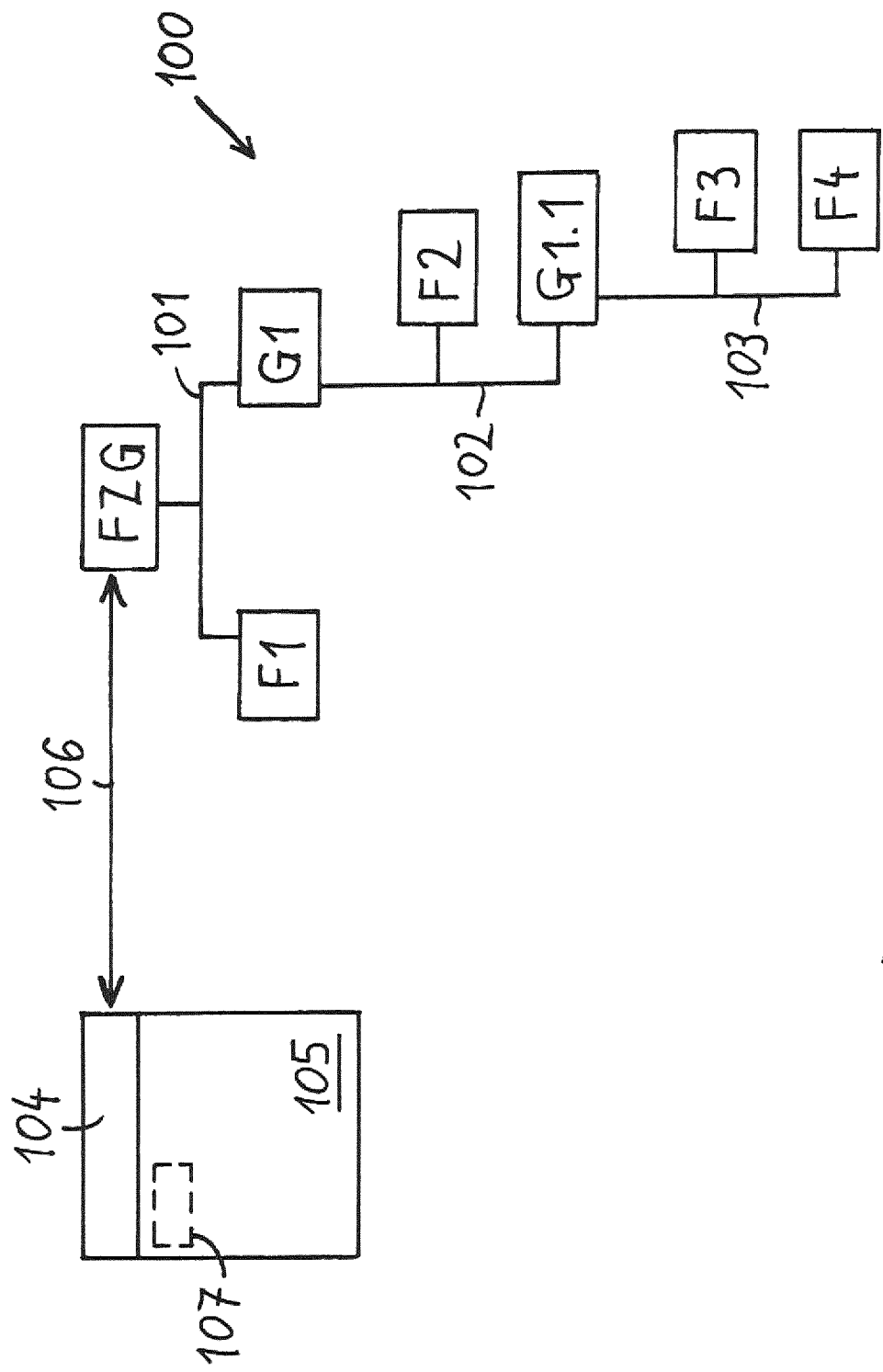
FIG. 1 shows a fieldbus network and a host, in which a device access software is installed.

FIG. 1 shows a fieldbus network 100, which includes a plurality of field devices and gateway devices. Located on the uppermost hierarchical level of the fieldbus network 100 is a field access device FAD. The field access device FAD is connected via a Profibus segment 101 with a field device F1 and a gateway device G1. The Profibus segment 101 is coupled via the gateway device G1 with an additional Profibus segment 102, to which are connected a field device F2 and a further gateway device G1.1. Via the gateway device G1.1, the Profibus segment 102 is coupled with a HART-segment 103, wherein the gateway device G1.1 is designed to convert the data traffic of the Profibus protocol into the HART protocol, and vice versa. Connected to the HART-segment 103 are the two HART field devices F3 and F4.

Nested fieldbus topologies frequently include one or more gateway devices. The fieldbus network 100 shown in FIG. 1 includes, for example, the two gateway devices G1 and G1.1. Generally, a gateway device serves as a converter between different fieldbus segments. In such case, a gateway device possesses, as a rule, its own address range. Via the addresses of such address range, devices connected to the gateway device can be accessed.

The terminology, "gateway device", includes, in such case, devices such as, for example, remote-IOs, gateways, links, couplers, protocol converters, multiplexers, etc.

In the case of a remote-IO, of concern is e.g. a local distributor node, to which one or more field devices or gateway devices can be connected. The remote-IO serves in first line for lessening the wiring effort. Instead of having to wire each component individually to a remote fieldbus network, a remote-IO is connected as distributor node to the fieldbus network, and the data traffic is forwarded via the remote-IO to the different field devices located in the neighborhood. In the case of a remote-IO, the aspect of local distribution of the data traffic is in the foreground.

In the case of a gateway, of concern in first line is the coupling between different fieldbus segments. In such case, the gateway cares for a suitable conversion of the data traffic between the fieldbus segments. These conversions can include a protocol conversion; this is, however, not absolutely the case.

In the case of a protocol converter, in contrast, the protocol conversion is in the foreground. The incoming data traffic is converted from a first fieldbus protocol into a second fieldbus protocol, or, in the reverse direction, from the second protocol into the first protocol. In the case of the example shown in FIG. 1, e.g. the gateway device G1.1 has such a protocol converter-functionality.

In the case of a multiplexer, the extension of the available address range is in the foreground. The multiplexer provides an address range, via which a plurality of devices connected to the multiplexer can be addressed. Corresponding to the addressing, the incoming data traffic is then routed to the appropriate target devices.

The parametering, configuration and state monitoring of the field devices of a fieldbus network occurs by means of a device access software 105 installed in a host 104. The host 104 is connected with the fieldbus network 100 via an Ethernet connection 106. The different components of the fieldbus network 100 can be accessed via the device access software 105. Especially, the parameters of the different components of the fieldbus network 100 can be read-out, displayed and changed by the device access software 105. Moreover, the device access software 105 enables a state monitoring (condition monitoring) of the components of the fieldbus network 100. The data exchange required for these tasks is, as a rule, conducted via the so-called acyclic data traffic.

In order that the different components and devices of the fieldbus network 100 can be accessed by the device access software 105, in each case, a suitable driver for the particular device, or the particular component, of the fieldbus network 100 must be present within the device access software 105. With the help of this driver, then the particular device, or the particular component, of the fieldbus network 100 can be accessed from the device access software 105.

In such case, the hierarchical structure of the fieldbus network 100 is recreated within the device access software 105 with the assistance of device drivers, e.g. device description files. In such case, the arrangement of the device drivers, e.g. device description files, corresponds, as a mirror image, to the structure of the fieldbus network.

The device access software 105 can be e.g. an FDT frame application, wherein FDT stands for "Field Device Tool". Integrated in the FDT frame application can be "Device Type Managers" (DTMs), thus device drivers for the different devices and components of the fieldbus network 100, wherein DTMs of different manufacturers can be integrated. Besides the standard FDT/DTM, there are alternative standards for the device access software and the device drivers integrated therein.

Figure 2:
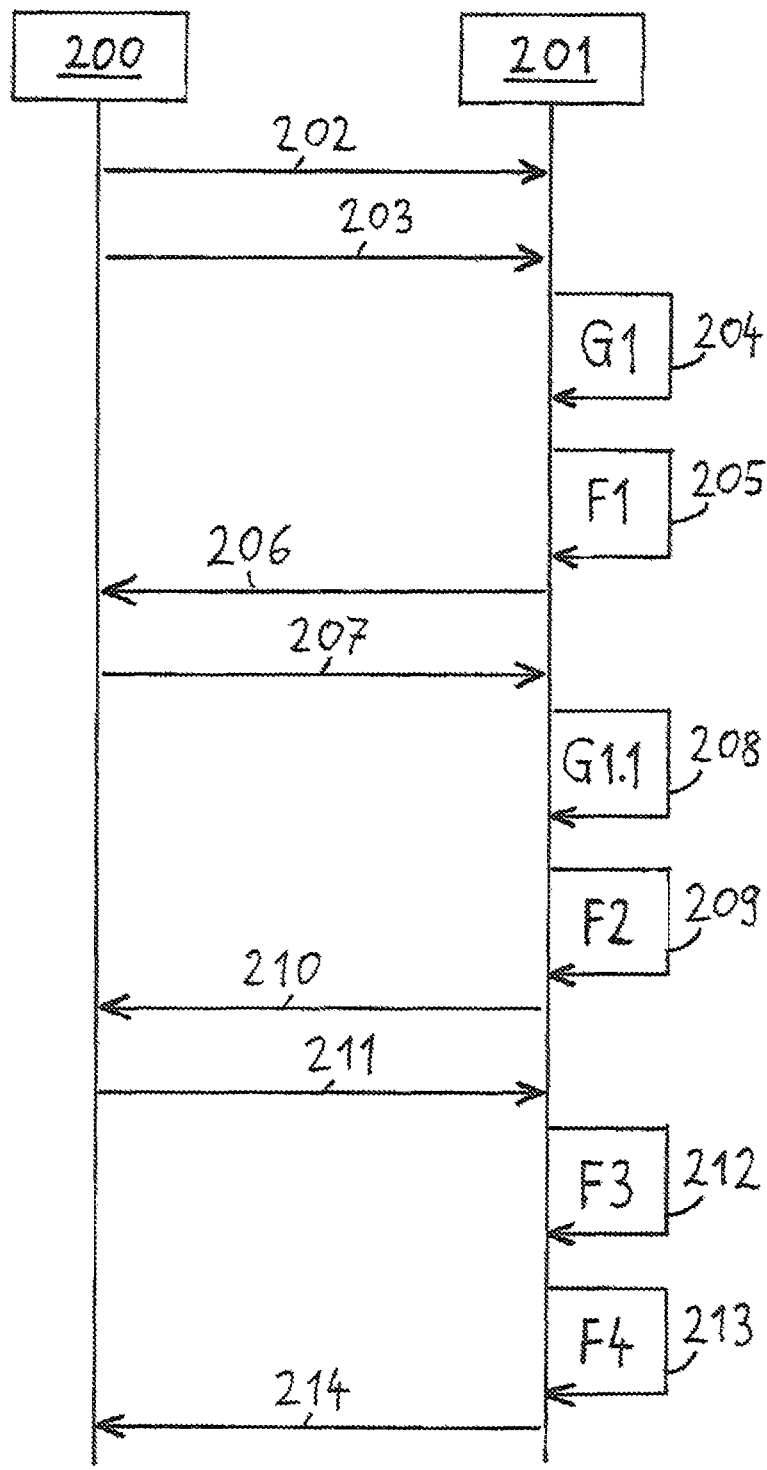
FIG. 2 shows a flow chart, in the case of which topology of the fieldbus network is registered by a plurality of manually triggered, scanning procedures.

FIG. 2 shows, via a flow chart, how in the case of the previous solutions of the state of the art the suitable drivers for the fieldbus network 100 were selected and integrated into the device access software. In such case, FIG. 2 shows the interactions between a user 200 and a frame application 201, into which the different device drivers are integrated.

First, in step 202, a communication DTM is inserted into the frame application 201 by user 200. The communication DTM is at the uppermost position of the DTM hierarchy and is associated with the field access device FAD. The communication DTM represents, in certain respects, the external interface of the device access software 105. All in- and out-going data traffic moves via the communication DTM.

In the next step 203, user 200 initiates a scan at the uppermost hierarchical level of the fieldbus network 100. In such case, the entire address space of the field access device FAD is scanned. For each address of the address space, it is ascertained whether with that address a component of the fieldbus network 100, especially a field device or a gateway device, is reachable.

When at a certain address a component of the fieldbus network 100 is found, then the frame application 201 queries a series of specifications from the found device, and, indeed, especially information concerning the device type, the manufacturer of the device, the hardware version and the software version of the device. Moreover, it is queried, for which fieldbus protocol and which protocol version the device is designed. In practice, the frame application queries from the newly found device one or more of the following pieces of information: manufacturer-ID, device-ID, device version, e.g. device revision, device profile, e.g. profile revision, software version, e.g. software revision, protocol version, e.g. command revision, etc.

During scanning of the address space of the field access device FAD, the gateway device G1 and the field device F1 are found, and, for each of the two found devices G1 and F1, the frame application 201 queries the device specifications set forth above in greater detail. In this way, on the one hand, the topology of the fieldbus network 100 can be ascertained. On the other hand, these specifications can be utilized to select suitable drivers for the found devices.

When, for a found device, a driver, e.g. a DTM, is present, which, with reference to device version, manufacturer, protocol version, software version of the device, exactly fits, then this driver can be immediately instantiated.

Frequently, however, no driver is available, which exactly fits with reference to all mentioned criteria. In this case, compromises are necessary to a certain degree. For a device, which has a certain software-, hardware- or protocol version, one could, for example, install a driver for an earlier (or later) hardware-, software- or protocol version, to the extent that the versions do not differ too greatly. Also, even an only approximately suitable device driver enables, as a rule, a disturbance free accessing of the device and the device parameters. The driver version and the device version cannot, however, differ too greatly. In the end, it is up to the user 200, which driver to accept.

When suitable drivers have been selected for the found devices, the frame application 201 initiates an instantiating of the drivers. For the gateway device G1 found in the scanning, in step 204, a suitable gateway DTM is integrated into the frame application 201, and for the field device F1, in step 205, a suitable device DTM is instantiated. In step 206, the user 200 is informed by the frame application 201 that the scan started in step 203 is terminated.

However, in the case of this scan, the topology below the gateway device G1 has not yet been registered. The gateway device G1 has its own address space, via which a plurality of connected devices and components can be addressed. Insofar, it is necessary, in an additional scanning procedure, to scan the address space of the gateway device G1. For this, the user 200 initiates in step 207 an additional scanning procedure, in the case of which the complete address range of the gateway device G1 is scanned through by the frame application 201.

In this scan, the gateway device G1.1 and the field device F2 are found. For each of the found devices and components, the frame application 201 queries the device specifications. Then, in step 208, the frame application 201 instantiates a suitable gateway DTM for the gateway G1.1, and, in step 209, a suitable device DTM for the field device F2. In the step 210 following thereon, the frame application 201 informs user 200 that the scan of the address space of the gateway G1 is terminated.

However, it is not yet known, which devices are present in the hierarchical levels below the gateway device G1.1. For this, user 200 initiates, in step 211, an additional scanning procedure, in the case of which the entire address space of the gateway device G1.1 is scanned through, address by address. In this scan, the two field devices F3 and F4 are ascertained. The frame application 201 then queries the device specifications for the two found field devices F3 and F4. Then, in step 212, the frame application 201 instantiates a suitable device DTM for the field device F3, and, in step 213, a device DTM for the field device F4. In step 214, the frame application 201 reports to the user 200 that the scan of the address space of the gateway device G1.1 is terminated.

In the case of the procedure illustrated in FIG. 2, the user 200 must sequentially manually initiate a plurality of individual scanning operations for the complete registering of the topology of a fieldbus network. Moreover, it must, in each case, after terminating a scan operation, select suitable drivers, e.g. DTMs, for the found devices and incorporate such into the device access software. Even in the case of a relatively simple fieldbus network, such as, for example, the fieldbus network 100 shown in FIG. 1, three separate scanning procedures are required, in order to register the complete topology. More comprehensive, nested, fieldbus networks can, in given cases, include 100 devices or more, and, accordingly, a manual scanning of the complete fieldbus topology is very burdensome, because the user must initiate multiple scans. Added to this is the fact that a user, in the case of initiating scanning procedures and in the case of instantiating suitable drivers in extensively nested fieldbus networks, can easily reach a point where it loses a suitable perspective, so that errors can occur in the performing of the scans and in the incorporating of the drivers.

In view of this situation, an automatic performing of the different scanning procedures will now be presented. This leads especially in the case of nested fieldbus topologies to a considerable simplification.

Figure 3:
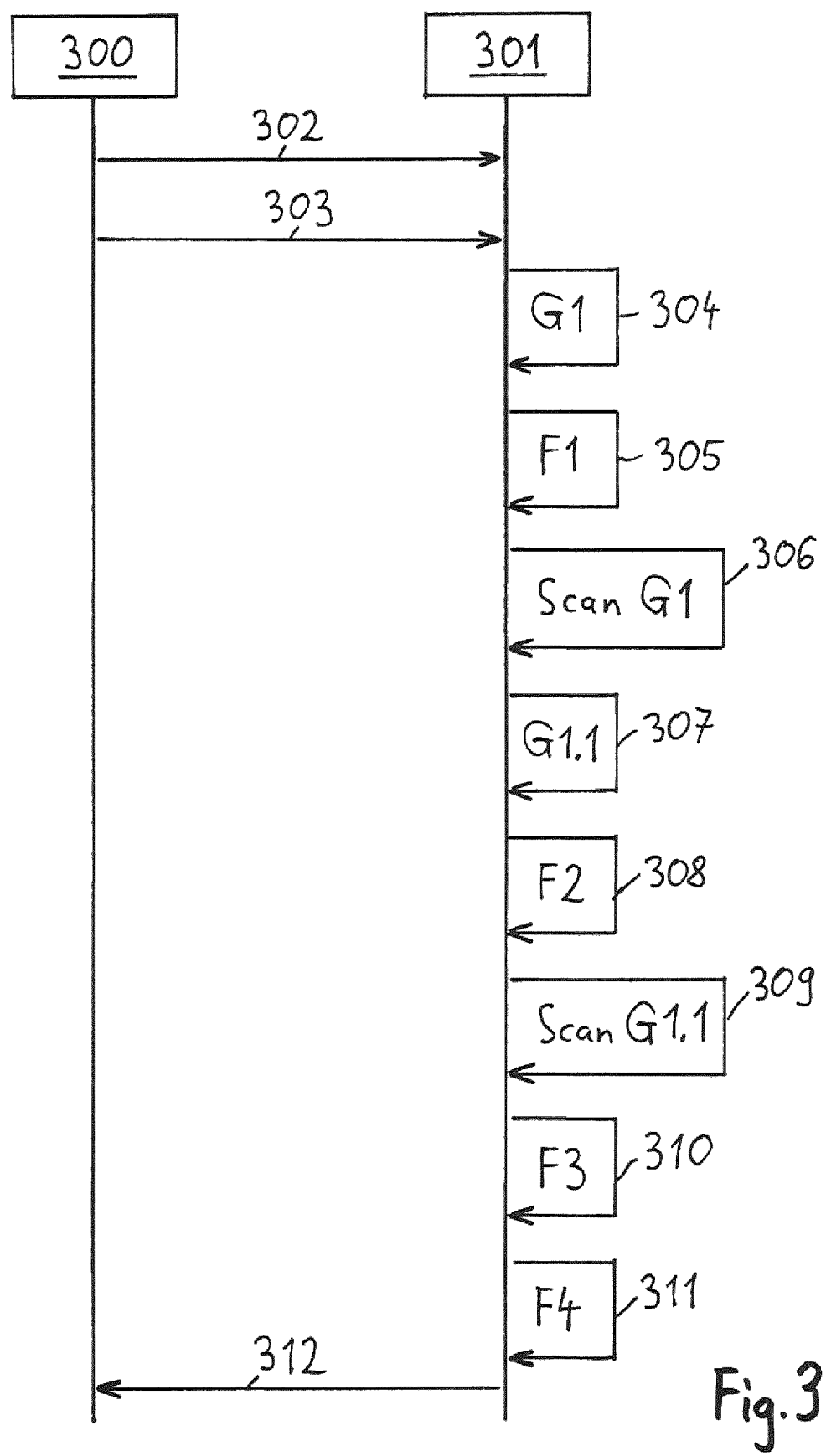
FIG. 3 shows a further flow chart, in the case of which the scanning procedures required for registering the topology are initiated automatically.

FIG. 3 shows a flow chart, in the case of which sequentially different scanning procedures are automatically initiated, in order to register the topology of a fieldbus network. In such case, the different scanning procedures are automatically initiated, so that a manual initiating of the scanning procedures, such as in FIG. 2, is not required in the case of the flow chart shown in FIG. 3.

For automatically performing the different scanning processes, a supplemental control software module 107, or plug-in, is provided within the device access software 105, as shown in FIG. 1 by the dashed box. This control software module 107 is designed to analyze the topology of the fieldbus network 100 and for each found gateway device automatically to initiate a scan of the address space of the gateway device.

FIG. 3 shows the interaction between a user 300 and a frame application 301. In the beginning, the user 300 instantiates in step 302 a communication DTM within the frame application 301. Then the user 300 starts in the next step 303 a scan of the total fieldbus network 100. In such case, first, a scan over the address space of the field access device FAD is performed. Found within this address space are the field device F1 and the gateway device G1. Thereupon, the frame application 301 queries the device specifications of the found field device F1 and the found gateway device G1. Especially, e.g. one or more of the following are queried: manufacturer-ID, device-ID, device version, or device revision, device profile, or profile revision, software version, or software revision, protocol version, or command revision. As soon as the device specifications of the field device F1 and the gateway device G1 are known to the frame application 301, suitable drivers for the field device F1 and the gateway device G1 are selected.

When a driver is found, which exactly fits as regards manufacturer, and hardware-, software- and protocol versions, then the found driver is immediately instantiated. When, however, there are differences as regards hardware-, software- or protocol versions between the found drivers and the found devices, then, based on the differences, the quality of the driver is determined with reference to the particular device. The better the driver fits the device, the higher is the quality value. When the driver, indeed, does not exactly fit the device, but the quality value of the driver lies above a predetermined limit value, then the driver is automatically instantiated and integrated into the frame application 301. This happens without further inquiry to the user 300. A further inquiry to the user 300 is only required, when the quality value of the available driver lies below the predetermined limit value.

When suitable drivers are found, these drivers are inserted into the driver hierarchy of the frame application 301 and automatically instantiated. In step 304, the driver for the gateway device G1 is instantiated, and, in step 305, the driver for the field device F1 is instantiated.

By scanning the address space of the field access device FAD, the topology of the fieldbus network 100 is now known down to the gateway G1. The topology in the hierarchical levels below the gateway G1 is, however, still unknown. For registering the topology below the found gateway G1, the control software module 107 triggers, in step 306, a scan of the address space of the gateway G1. The control software module 107 is designed to initiate automatically for each found gateway device a scan of the address space of the gateway device. The initiating of these scanning procedures occurs, consequently, automatically and without further inquiry to the user 300. In the scanning of the address space of the gateway device G1, the gateway device G1.1 and the field device F2 are found. Then, the device specifications of the gateway device G1.1 and the field device F2 are queried, following which suitable drivers, e.g. DTMs, are instantiated for the two devices. In step 307, the frame application 301 instantiates a gateway DTM for the gateway device G1.1, and, in step 308, a device DTM for the field device F2.

After step 308, the topology of the fieldbus network 100 is known down to the gateway device G1.1. The structure below the gateway device G1.1 is, however, still unknown. Thus, the control software module 107, in step 309, initiates a scan of the address space of gateway G1.1. In this scan, the field devices F3 and F4 are found. After query of the device specifications of the found field devices F3 and F4, in step 310, the frame application 301 instantiates a suitable device DTM for the field device F3, and, in step 311, a device DTM for the field device F4.

In the last performed scan of the address space of gateway device G1.1, only field devices were found, no longer any gateway devices. Thus, it is clear that one has arrived at the end of a branch of the branched fieldbus network 100. One has, thus, so-to-say, reached the "leafs" of the tree structure. Since there are in the fieldbus network 100 no additional branches to be scanned, the frame application 301 informs the user 300, in step 312, that the scanning procedure for the entire fieldbus network 100 is terminated.

By means of the automatic scan of a complete fieldbus network 100 shown in FIG. 3, it is possible to analyze fieldbus networks in one pass-through without further inquiry to the user 300 and to register the topology of the particular fieldbus network. The so acquired information concerning the topology of the fieldbus network can be used, such as shown in FIG. 3, to instantiate suitable device DTMs and gateway DTMs for the found devices. In this way, a suitable hierarchical DTM-structure is established within the frame application 301 automatically during the scanning procedure.

Figure 4:
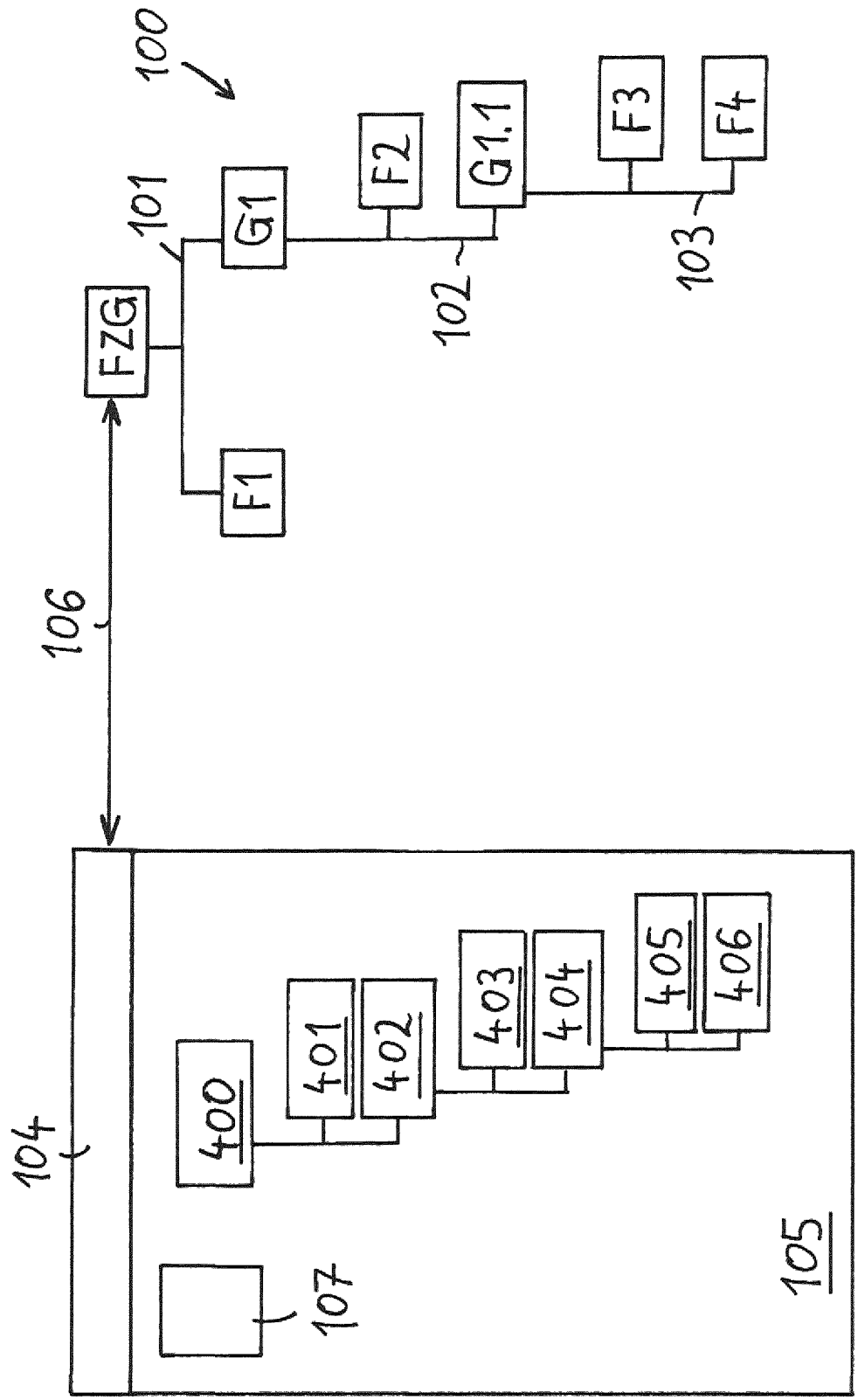
FIG. 4 shows the fieldbus network of FIG. 1, wherein a plurality of drivers are integrated into the frame application.

FIG. 4 shows the fieldbus network 100 of FIG. 1 with finished device access software 105. Also shown is the control software module 107, which is designed automatically to start the different needed scanning operations and to instantiate for each of the found components a suitable driver, e.g. DTM, in the device access software 105. In each case, then, when the control software module 107 in the scanning finds a further gateway device, the control software module 107 automatically initiates a scan of the address space of this gateway device. By means of the method described in FIG. 3, a hierarchy of drivers, e.g. DTMs, is set up within the device access software 105, as a mirror image of the structure of the fieldbus network 100. Located at the uppermost position of the DTM hierarchy is the communication DTM 400. In the hierarchical level below the communication DTM 400 are located the device DTM 401 for the field device F1 and the gateway DTM 402 for the gateway device G1. Thereunder are located the device DTM 403 for the field device F2 and the gateway DTM 404 for the gateway device G1.1. Arranged at the lowest level of the DTM hierarchy are the two device drivers 405 and 406 for the two field devices F3 and F4.

With the help of this hierarchical driver structure, each field device and each gateway device of the fieldbus network 100 can be accessed. In such case, the scanning of the fieldbus topology and the instantiating of the drivers, e.g. DTMs, is performed fully automatically by the control software module 107 in accordance with the flow chart illustrated in FIG. 3.

In the presentation until now, a frame application of the FDT (Field Device Tool) standard was described. Integrated into this FDT frame application can be drivers of DTM (Device Type Manager) format for different devices and from different manufacturers. The FDT standard is being increasingly supplemented by the standard, FDI Device Packages.

Besides the standards, FDT/DTM and FDI Device Packages, there are a large number of other standards for device description files and drivers. To be mentioned are, for example, the standards, DD (Device Description) and EDD (Enhanced Device Description). Especially in the case of the standard EDD, specified supplementally to device parameters, device functionality and address space occupation are also graphic features and graphical user interfaces, for facilitating parametering and configuring of field devices.

Along with that, the so-called Industrial Ethernet protocols are gaining importance, to which belong, among others, the fieldbus protocols, EtherNet/IP, Profinet and EtherCAT. These Industrial Ethernet protocols have particular device description files. For example, in the case of the fieldbus protocol, EtherNet/IP, a device description file is provided corresponding to the standard EDS (Electronic Data Sheet) for description of both cyclic as well as also acyclic, data exchange.

Figure 5:
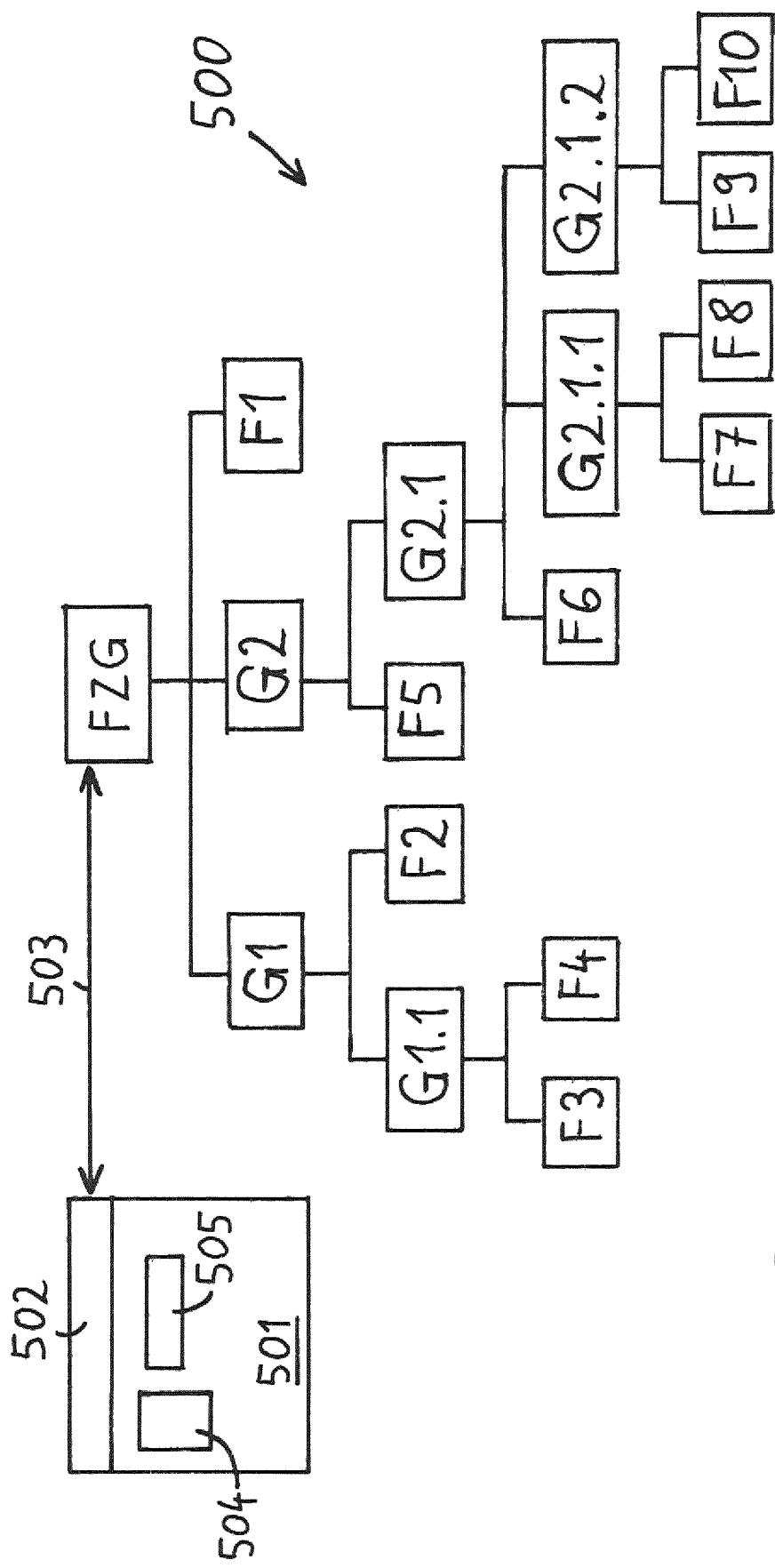
FIG. 5 shows an example of a complexly branched fieldbus network.

The scanning method described in FIG. 3 is suited especially also for the fully automatic scanning of complex, nested, fieldbus topologies. In such case, a plurality of scanning operations registers the structures of the fieldbus network with its branches. For presenting how the scanning method sequentially handles the different fieldbus segments, FIG. 5 shows an example of a complex, nested, fieldbus network 500. The accessing of the fieldbus network 500 occurs, in such case, via a field access device FAD, which is located at the uppermost position of the fieldbus hierarchy. A device access software 501, with which the different devices and components of the fieldbus network 500 can be accessed, is installed in a host 502, which is connected with the field access device FAD and the fieldbus network 500 via an Ethernet connection 503. The device access software 501 includes a control software module 504, which is designed to start sequentially a plurality of different scanning operations, in order, in this way, progressively to register the complete topology of the fieldbus network 500. For each found device, and each found component, of the fieldbus network 500, a corresponding driver, e.g. a DTM, is integrated into the DTM hierarchy of the device access software 501. This begins, in such case, with the instantiating of the communication DTM 505 for the field access device FAD.

Based on FIG. 6, it will now be described, how the scanning method described in FIG. 3 works through the different branches and fieldbus segments of the branched fieldbus network 500, and, in such case, sequentially registers one fieldbus segment after the other. First, the control software module 504 initiates a scan 600 of the address space of the field access device FAD. In such case, the gateway devices G1 and G2 and the field device F1 are found. For determining the topology below the gateway device G1, the control software module 504 then initiates a scan 601 of the address space of the gateway device G1. In such case, the gateway device G1.1 and the field device F2 are found. Thereupon, a scan 602 of the address space of the gateway device G1.1 is performed, and, in the case of this scan 602, the two field devices F3 and F4 are found. Since in the scan 602 only field devices were found, the end of this branch of the fieldbus network 500 has been reached, and the topology scan goes back to higher hierarchical levels of the fieldbus network 500. Since the scan 601 only delivered the one gateway G1.1, the topology scan goes back to the result of the scan 600 and continues there with the second gateway device G2. In the case of the scan 603, the address space of the gateway device G2 is scanned, and, in such case, the gateway device G2.1 and the field device F5 are ascertained. Thereupon, the address space of the gateway device G2.1 is examined with an additional scan 604. In such case, the two gateway devices G2.1.1 and G2.1.2 and the field device F6 are found. In order to register the topology below the gateway device G2.1.1, a scan 605 of the address space of gateway device G2.1.1 is performed. In the case of this scan 605, the two field devices F7 and F8 are found, so that here the end of this branch has been reached. The topology scan then goes back to the result of the scan 604, in the case of which, supplementally to the already investigated gateway device G2.1.1, also a second gateway device G.2.1.2 was found. For this gateway device G.2.1.2, the control software module 504 then initiates a scan 606. In the case of this scan 606, the two field devices F9 and F10 are found, so that now also here the end of the branch has been reached. The topology scan goes back to the search result of the scan 604 and establishes that there are no additional gateway devices present to be examined. Thereupon, the topology scan goes back to the search result of the scan 603 and establishes that also here no more additional gateway devices are present to be examined. Thereupon, the topology scan goes back to the search result of the scan 600, with which the address space of the field access device FAD was examined. The two found gateway devices G1 and G2 have already been worked through. There is no further gateway device. Therefore, the topology scan is terminated.

The control software module has now completely scanned the topology of the fieldbus network 500, wherein, for the scan of the topology, a total of seven sequentially automatically triggered scans 600-606 were required, which were sequentially initiated by the control software module 500.

Figure 6:
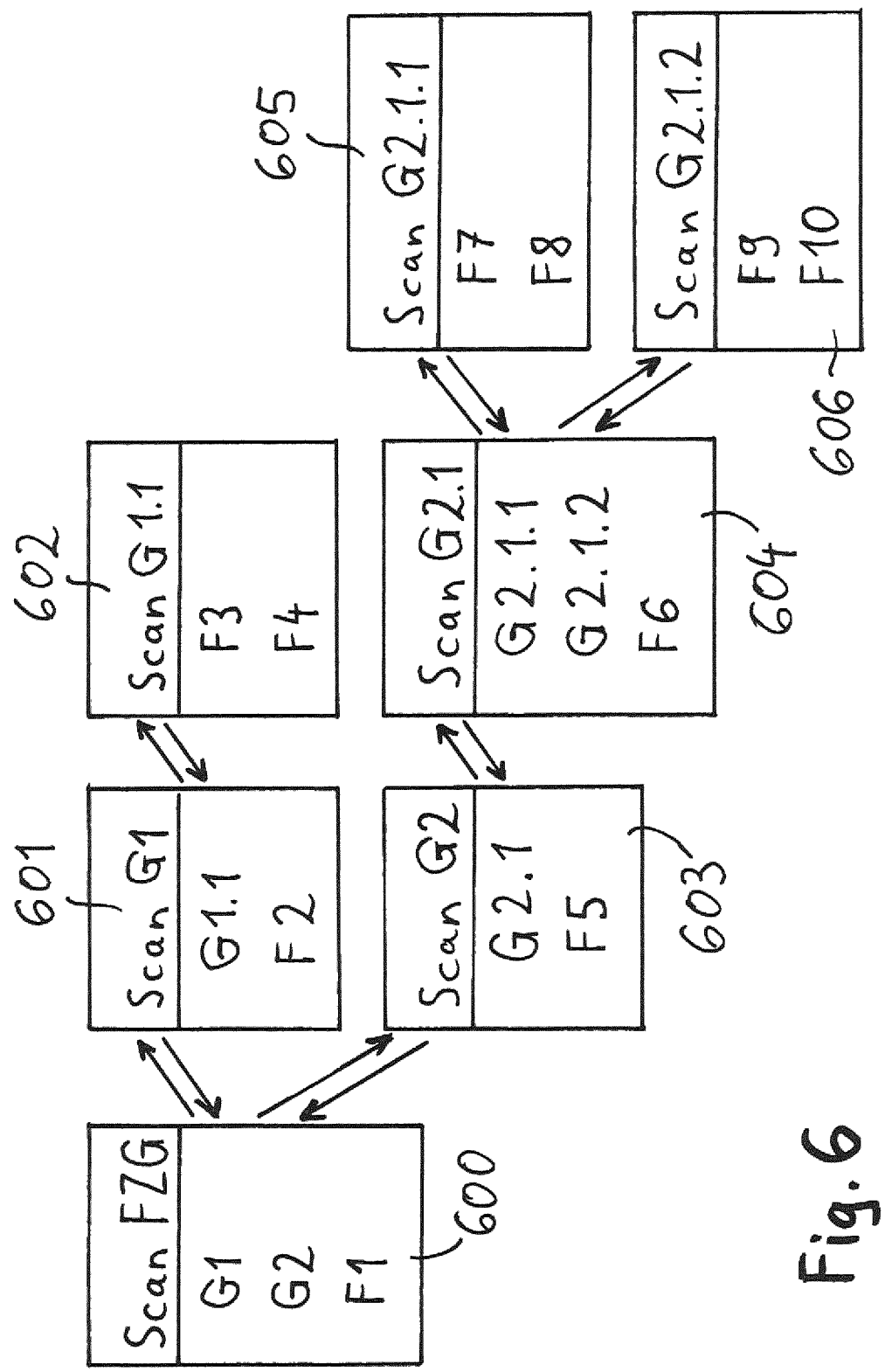
FIG. 6 shows a schematic representation of the scanning operations required for registering the topology of the fieldbus network of FIG. 5.

In the case of the example shown in FIGS. 5 and 6, the complete tree of an installation was scanned starting from the communication DTM 505 with the assistance of the sequentially performed scans 600-606. With the help of these scans 600-606, the complete hierarchical arrangement of the different field devices and gateway devices of the fieldbus network 500 was completely automatically registered, without requiring any interaction by the user.

Alternatively thereto, the automatic topology scan could, however, also be run for only a portion of the tree of the installation, wherein, in the case of a gateway DTM, start is from a certain gateway device. For example, in FIG. 5, the portion of the tree of the installation below the gateway device G2.1 could be scanned. For registering the topology of the portion below the gateway device G2.1, only the scans 604, 605 and 606 of FIG. 6 would be performed. In this way, starting from the gateway DTM belonging to the gateway device G2.1, the topology below the gateway device G2.1 could be registered.

In an additional embodiment, the topology scan could be performed in accordance with rules, which the user earlier establishes. For example, the user could perform a topology scan for the fieldbus network 500 shown in FIG. 5 and, in such case, specify that the topology be registered only down to a depth of two hierarchical levels. This could make sense, for example, when the user wants only to create a sample of the structure of the plant. In this case, the scanning operations would be performed to the second hierarchical level below the field access device FAD, wherein in the second hierarchical level the components G1.1, F2, F5 and G2.1 would be found. Then the scan would be interrupted, so that the structure below the gateway devices G1.1 and G2.1 would not be registered. With reference to FIG. 6, the scanning operations would thus be only the scans 600, 601 and 603 and the remaining scans of FIG. 6 would not be run.

The rules set up by the user for performing the topology scan could, for example, also refer to which manufacturer the different components of the fieldbus network 500 come from. For example, the user could set up a topology scan, in the case of which only the nodes of a certain manufacturer are followed, while the nodes of other manufacturers are ignored in the scanning procedure.

To be emphasized, moreover, is that a topology scan for registering the structure of the fieldbus network 500 must not necessarily be performed in a single passage. It is rather also possible to interrupt an unfinished topology scan at a certain location and to continue at such location at a later point in time. Especially, extensive fieldbus networks can so be scanned in a number of steps.

The topology scan shown in FIGS. 5 and 6 can be applied for registering an as yet unknown network topology. Alternatively thereto, it is, however, also possible to use the topology scan for reconciling, or for verifying, a topology already registered at an earlier point in time. By such a reconciling of the current topology state with an earlier topology state, especially newly entered components or earlier present and now omitted components can be registered and highlighted. This can serve as a basis for an updating of the driver structure in the device access software. In such case, no longer required drivers are removed, while new drivers for the newly added components are inserted into the FDT frame application.

The invention claimed is:

1. A method for automatically registering a topology of a fieldbus network from a device access software, wherein the device access software is installed in a host which is in data connection with the fieldbus network, and wherein the fieldbus network includes a plurality of field devices and gateway devices, the method comprising:

scanning an address space of a field access device or of a predetermined gateway device of the fieldbus network to find gateway devices and field devices present in the address space;

querying device specifications from the gateway devices and the field devices present in the address space, wherein the device specifications include a hardware version, a software version, and a protocol version of a queried device;

comparing a first device driver with the device specifications of the queried device and determining of a quality value of the first device driver based on differences between the first device driver and the device specifications of the queried device;

instantiating and integrating into the device access software the first device driver when the quality value of the first device driver is above a predetermined limit value;

scanning an additional address space provided by each found gateway device to find additional gateway devices and additional field devices present in the additional address space;

querying the device specifications from the additional gateway devices and the additional field devices present in the additional address space;

comparing a second device driver with the device specifications of a queried additional device and determining of a quality value of the second device driver based on differences between the second device driver and the device specifications of the queried additional device;

instantiating and integrating into the device access software the second device driver when the quality value of the second device driver is above the predetermined limit value;

repeating the scanning of an additional address space for each found additional gateway device until all gateway devices present in the fieldbus network in a region below the field access device or below the predetermined gateway device are found or until a break condition is fulfilled; and comparing a result of the registering of the topology of the fieldbus network with a stored earlier version of the topology of the fieldbus network and highlighting possible changes compared with the earlier version.

2. The method as claimed in claim 1, wherein the method is configured to register the topology of the fieldbus network in the region below the field access device or below the predetermined gateway device.

3. The method as claimed in claim 1, wherein the device specifications queried from the gateway devices and field devices include one or more of the following: manufacturer-ID, device-ID, protocol version, command revision, device version, device revision, software version, software revision, device profile, and device profile revision.

4. The method as claimed in claim 1, further comprising:
when the quality value of the first device driver or the second device driver is below the predetermined limit value, manually selecting a suitable device driver by a user.

5. The method as claimed in claim 1, further comprising:
producing a first scan command for the address space of the field access device or of the predetermined gateway device and transmitting the scan command to the field access device or to the predetermined gateway device;
producing a second scan command for the additional address space for each found additional gateway device and transmitting the second scan command to each found additional gateway device;
evaluating a first scan result obtained from the field access device or the predetermined gateway device; and/or
evaluating a second scan result obtained from each found additional gateway device.

6. The method as claimed in claim 1, wherein the device access software includes a control software module.

7. The method as claimed in claim 6, wherein:
the control software module automatically initiates the scanning of the address space of the field access device or the predetermined gateway device;
the control software module produces a scan command for the address space of the field access device or the predetermined gateway device and transmits such to the field access device or the predetermined gateway device;

the control software module automatically initiates the scanning of the additional address space provided by a found gateway device;
the control software module produces a scan command for the additional address space provided by a found gateway device and transmits such to the found gateway device;
the control software module evaluates a scan result obtained from the field access device or the predetermined gateway device;
the control software module evaluates scan results obtained from the found gateway devices;
the control software module automatically queries device specifications of gateway devices present in the address space of the field access device or the predetermined gateway device; and/or
the control software module automatically queries device specifications from additional gateway devices present in the additional address space.

8. The method as claimed in claim 1, wherein the gateway devices of the fieldbus network include at least one of the following: one or more remote-IOs, one or more gateways, one or more links, one or more couplers, one or more protocol converters, and one or more multiplexers.

9. The method as claimed in claim 1, wherein at least one of the gateway devices has two or more channels, wherein via each of the channels a subaddress space is addressable, and wherein the scanning of the address space of the at least one gateway device includes the scanning of the subaddress spaces.

10. The method as claimed in claim 1, wherein the scanning of the fieldbus network is executed only down to a predeterminable depth below the field access device or below the predetermined gateway device.

11. The method as claimed in claim 1, wherein the scanning of the fieldbus network is performed only for field devices or gateway devices of a certain manufacturer.

12. The method as claimed in claim 1, wherein:
the device access software is a frame application in accordance with the FDT standard;
the device access software is a frame application in accordance with the FDT standard, wherein drivers in accordance with the DTM standard are insertable into the frame application;
the device access software is a frame application in accordance with the FDT standard, wherein communication DTMs, gateway DTMs and device DTMs are insertable into the frame application;
the device access software is designed for device description files or drivers in accordance with at least one of the following standards: DTM, DD, EDD, EDL, FDI; and/or
used within the fieldbus network are one or more the following fieldbus protocols: Fieldbus Foundation; HART, Profibus, ModBus, CANopen, IO-Link, EtherCAT, Interbus, Profinet, Profinet IO, DeviceNet, CompoNet, other industrial Ethernet protocols and other fieldbus protocols.

* * * * *